United States Patent [19]

Niles et al.

[11] 4,434,213

[45] Feb. 28, 1984

[54] LITHIUM ANODE

[75] Inventors: Aaron F. Niles; Dennis P. Johnson, both of Madison, Wis.

[73] Assignee: Rayovac Corporation, Madison, Wis.

[21] Appl. No.: 377,821

[22] Filed: May 13, 1982

[51] Int. Cl.$^3$ .............................................. H01M 6/16
[52] U.S. Cl. ....................................... 429/3; 429/194; 429/218
[58] Field of Search ................. 429/194, 197, 218, 50, 429/3

[56] References Cited

U.S. PATENT DOCUMENTS

| | | |
|---|---|---|
| 3,607,412 | 9/1971 | Buzzelli ............................... 429/218 |
| 4,002,492 | 1/1977 | Rao ..................................... 429/218 |
| 4,056,885 | 11/1977 | Rao ..................................... 429/218 |
| 4,130,500 | 12/1978 | Melendres et al. ................. 429/218 |
| 4,233,376 | 11/1980 | Atkinson et al. ................... 429/218 |

Primary Examiner—Donald L. Walton
Attorney, Agent, or Firm—Kenyon & Kenyon

[57] ABSTRACT

A lithium-organic electrolyte cell which is provided with an aluminum-magnesium alloy cladding on the lithium anode. The cladding provides a cell having improved pulse performance.

8 Claims, No Drawings

LITHIUM ANODE

The present invention pertains to lithium-organic electrolyte cells and more particularly to lithium-organic electrolyte cells having improved pulse performance.

BACKGROUND OF THE INVENTION AND PRIOR ART

Lithium-organic electrolyte cells have been known. Such cells employ an electrolyte which may be for example propylene carbonate, dioxolane, tetrahydrofuran, dimethoxyethane, etc. The organic electrolyte contains a dissolved lithium salt which may for example be lithium perchlorate, lithium hexafluorophosphate, lithium tetrafluoroborate, lithium aluminum tetrachloride, lithium thiocyanate, etc. The cathode employed may for example be a material such as iron sulfide (FeS). In cells to which the invention is directed, the anode polarizes more than does the cathode during a pulse discharge. The concentration of lithium salt in the electrolyte would generally range from about 1 to about 3 molar.

The art has recognized heretofore that problems exist in using lithium as the anode in organic electrolyte cells. These problems have to do with the reactivity of lithium, the formation of lithium compound films on the surface of the lithium anode during use, and the low surface area of lithium foils. Such features lead to adverse electrochemical effects such as lower discharge rates and insufficient voltage on pulse discharge.

It has been proposed in U.S. Pat. Nos. 4,002,492 and 4,056,885 to employ lithium-aluminum alloys as anodes in organic electrolyte cells. Thus, U.S. Pat. No. 4,002,492 describes use of a lithium-aluminum alloy containing about 63% to about 92% lithium on an atomic basis.

U.S. Pat. No. 4,056,885 describes the production of a lithium-aluminum alloy on the surface of a lithium electrode by the practice of laminating aluminum foil to the lithium anode and exposing the perforated foil to the action of the electrolyte containing a lithium salt. Alloying of the lithium and aluminum is said to begin in times of up to about 24 hours.

SUMMARY OF THE INVENTION

A lithium anode is provided for use in a lithium-organic electrolyte cell having a cathode which is polarized to a lesser extent on pulse discharge than is the anode wherein the face of the lithium anode adjacent to the separator is laminated with an alloy foil coating made of an aluminum-magnesium alloy. A lithium-aluminum-magnesium alloy forms on the surface of the anode and discharge of lithium ions occurs. The aluminum-magnesium foil preferably contains about 2% to about 3%, by weight, magnesium with the balance essentially aluminum and the foil may have an initial thickness of about 1 to 7% of the total laminated anode. The initial aluminum-magnesium alloy foil will contain at least an effective amount of magnesium, which may be about 1% or even less magnesium, up to about possibly 10% magnesium. Excessive magnesium in the alloy can limit cell capacity.

Laminated lithium anodes provided in accordance with the invention provide a closed circuit voltage (CCV) during pulsing which is higher than that obtained using identical cells wherein the lithium anode is covered with a foil of essentially pure aluminum. In addition, lithium anodes provided in accordance with the invention also have a higher rate capability than do anodes of lithium alone or foil anodes having a homogeneous bulk composition identical to the laminated material of the invention.

DETAILED DESCRIPTION OF THE INVENTION

Lithium foil having a clean, dry surface is laminated with aluminum-magnesium foil preferably having a magnesium content of about 2% to about 3% and having a commercial finish. The complete laminate is then cut and fitted into the cell lid and welded therein. The laminate is so oriented that the aluminum-magnesium foil is situated on the side of the anode which faces the separator. Alloying of the surface laminate with lithium occurs under the normal compression of the internal cell parts. As noted herein before, the electrolyte which may be propylene carbonate-dimethoxyethane contains a lithium salt which may be lithium perchlorate.

The aluminum-magnesium layer may be perforated, for example, holes about 0.5 mm in diameter with the hole density of 70 to 120 holes per square centimeter, or may be unperforated. Formation of a surface alloy layer between the underlying lithium and the alloy cladding appears to proceed slightly more rapidly when the foil is perforated. With exposure of the laminate to the cell electrolyte, alloying proceeds by diffusion within the composite anode material. It seems likely that with transport of lithium ions through the surface during discharge of the cell that the final anode material remaining upon complete discharge of the cell will be primarily alloy. During formation of the alloy layer, the surface of the anode becomes roughened or wrinkled appearing much like the surface of a walnut shell. This roughening or wrinkling effect substantially increases the surface area of the anode and may be a contributing factor in the improved discharge characteristics obtained in accordance with the invention. The presence of an effective amount of magnesium in the aluminum-magnesium alloy contributes to the roughening or wrinkling effect.

In general, the bulk composition of the anode alloy formed by surface lamination should be about 75.3 to 95 weight percent lithium, about 5 to 24 weight percent aluminum and about 0.1 to 0.6 weight percent magnesium. Stated in another way, the initial cladding layer may contain, by weight about 2% to about 3% magnesium, with the balance essentially aluminum and the cladding layer may constitute about 1% to about 7% of the thickness of the composite consisting of the cladding layer and the underlying lithium layer. Thicker cladding layers seem to perform on pulsing better at low temperature such as −10° C. than do thinner materials.

Some examples may now be given.

EXAMPLE 1

A number of lithium/iron sulfide primary cells were produced using lithium anodes in accordance with the invention and other anodes outside the scope of the invention. Electrolyte employed was propylene carbonate-dimethoxyethane containing lithium perchlorate at about 1.2 molar concentration. The cells had a capacity of about 40 milliampere hours. The average pulse closed circuit voltage (CCV) was determined using a pulse across 200 ohms and measured after 5 seconds. Average CCVs were measured at 0%, 40% and 80% depth of discharge (DOD) using lots of 3 cells for each test with the results shown in the following Table I. Table I also provides the thickness (mils) of lithium and of aluminum or aluminum alloy employed for each anode. The aluminum alloy foil employed was 5052 alloy, a commercial material containing about 2% magnesium.

TABLE I

| | Anode Thickness mils | | | AVERAGE BACKLIGHT PULSE CCV(V) | | | | | |
|---|---|---|---|---|---|---|---|---|---|
| | | | | RT | | | −10° C. | | |
| Lot | Li | Clad | Anode Composition (w/o) | 0% DOD | 40% DOD | 80% DOD | 0% DOD | 40% DOD | 80% DOD |
| 333* | 33 | 2 | 77 Li, 22.4 Al, 0.6 Mg | 1.078 | 1.166 | 0.917 | — | — | — |
| 331 | 30 | 0.3 | 95.2 Li, 4.8 Al | 0.802 | 1.083 | 0.645 | — | — | — |
| 354* | 30 | 2 | 75.3 Li, 24.1 Al, 0.6 Mg | 1.059 | 1.159 | 1.009 | 0.703 | 0.793 | 0.560 |
| 355* | 30 | 0.9 | 87.1 Li, 12.6 Al, 0.3 Mg | 1.056 | 1.162 | 1.042 | 0.653 | 0.780 | 0.487 |
| 356* | 30 | 1.4 | 81.3 Li, 18.2 Al, 0.4 Mg | 1.033 | 1.143 | 1.004 | 0.653 | 0.787 | 0.510 |
| 357* | 30 | 2 | 75.3 Li, 24.7 Al | 0.943 | 1.089 | 1.075 | 0.520 | 0.720 | 0.527 |
| 359 | 30 | 2 | 75.3 Li, 24.1 Al, 0.6 Mg | 1.029 | 1.163 | 1.100 | 0.663 | 0.747 | 0.607 |
| 226 | 30 | 1 | 83.6 Li, 16.4 Al | 0.932 | — | — | — | — | — |
| 398 | 30 | 0.9 | 87.1 Li, 12.6 Al, 0.3 Mg | 1.115 | 1.213 | 0.992 | — | — | — |
| 399 | 30 | 2 | 75.3 Li, 24.1 Al, 0.6 Mg | 1.095 | 1.201 | 0.953 | — | — | — |
| 400* | 30 | 2 | 75.3 Li, 24.1 Al, 0.6 Mg | 1.176 | 1.209 | 0.882 | — | — | — |
| 402 | 30 | — | 100 Li | 0.861 | 1.132 | 0.827 | — | — | — |
| 397* | 30 | 2 | 75.3 Li, 24.7 Al | — | — | — | — | — | — |

*perforated alloying foil

The pulse across 200 ohms is the test for "backlight" pulse in many digital watches. Cells were depleted on a 12,500 ohm load. Compositions were calculated based on the total material content of the cladding material and the Li substrate. Similar pulsing was done for 2000 ohms at 7.8 ms/sec at −10° C. as shown in Table II.

A review of the data of Tables I and II demonstrates that the surface-alloyed lithium anode of the invention is superior to unalloyed lithium and has a backlight pulse 100 to 150 mV higher than that of a lithium anode faced with aluminum. Similar improvements are provided on analog pulse.

TABLE II

| | | AVERAGE ANALOG CCV(V) | | |
|---|---|---|---|---|
| Temp, °C. | Lot | 0% DOD | 40% DOD | 80% DOD |
| −10 | 402 | 1.371 | 1.273 | 1.206 |
| −10 | 400 | 1.410 | 1.345 | 1.306 |
| −10 | 399 | 1.481 | 1.435 | 1.351 |
| −10 | 398 | 1.480 | 1.454 | 0.354 |

EXAMPLE 2

The capacity of cells produced in accordance wih the invention was compared to that of cells having a plain lithium anode and a lithium anode having a surface cladding of aluminum. The data are given in Table III as the average milliampere hours to 1.2 EPV on 25000 ohms continuous drain (n=6).

TABLE III

| Lot | Initial mAh | 60° C. Aged Cells (60 days) |
|---|---|---|
| 402 | 36.3 | 31.2 |
| 400 | 41.2 | 36.0 |
| 399 | 40.5 | 37.0 |
| 398 | 42.5 | 38.0 |
| 333 | 42.8 | 41.5* |
| 397 | 41.2 | 41.0 |

*20d storage

EXAMPLE 3

Cells having surface-alloyed anodes provided in accordance with the invention were compared for pulse performance and capacity to cells having foil anodes made of a bulk lithium alloy having the same homogeneous bulk composition with the results shown in the following Tables IV and V. The distinct advantage of a surface formed alloy is considered to be a general effect translatable to any composition alloys, e.g. Li-Al-Mg.

TABLE IV

| | | AVERAGE PULSE CCV | | |
|---|---|---|---|---|
| Lot | Description | 0% DOD | 40% DOD | 80% DOD |
| 360 | Li—Al Bulk Alloy | 0.705 | 0.962 | 0.734 |
| 353 | Li—Al Surface Formed Alloy | 1.086 | 1.154 | 0.955 |

TABLE V

| | Average mAh to 1.2 EPV on 25K ohm n = 6, XR926 | |
|---|---|---|
| Lot | Description | mAh |
| 360 | Bulk Li—Al Alloy | 34.7 |
| 354 | Surface Formed Li—Al Alloy | 39.3 |

EXAMPLE 4

Samples of the surface alloy formed on lithium anodes initially having an aluminum-magnesium cladding layer exposed in cells containing propylene carbonate-dimethoxyethane electrolyte with 1.2 molar lithium perchlorate for various times were analyzed. The samples were obtained as surface scrapings from the wrinkled surfaces of the anodes. The results obtained are as follows:

TABLE VI

| | NORMALIZED COMPOSITION OF Li—Al/Mg SURFACE ALLOYS | | |
|---|---|---|---|
| Age | Wt. % Al | Wt. % Mg | Wt. % Li |
| Cladding layer, 6% of total anode thickness | | | |
| 6 days | 71.9 | 1.9 | 26.1 |
| 8 weeks | 49.2 | 1.4 | 49.5 |
| (Calculated Bulk: | 24.1 | 0.6 | 75.3) |
| Cladding layer, 3% of total anode thickness | | | |
| 6 days | 64.5 | 1.7 | 33.8 |
| 8 weeks | 53.5 | 1.2 | 45.3 |

TABLE VI-continued

| NORMALIZED COMPOSITION OF Li—Al/Mg SURFACE ALLOYS | | | |
| --- | --- | --- | --- |
| Age | Wt. % Al | Wt. % Mg | Wt. % Li |
| (Calculated Bulk: | 12.6 | 0.3 | 87.1) |

The data shows the slow penetration of the surface formed alloy into the Li substrate.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims. Thus, while the invention has been exemplified in terms of cells having a propylene carbonate-dimethoxyethane electrolyte containing lithium perchlorate as a solute, it is to be understood that the invention is operable with other electrolyte systems and solutes recognized in the art as being compatible with reactive anode materials such as lithium. For example, known organic electrolytes based upon 3-methyl-2 oxazolidone may be used.

We claim:

1. In an improved lithium-organic electrolyte cell having a lithium salt dissolved in said electrolyte and having a separator facing the anode, the improvement which comprises the anode having a body of lithium initially cladded wih a cladding layer of aluminum-magnesium alloy, the cladding layer laminated to the face of the anode body adjacent to the separator, and a ternary aluminum-magnesium-lithium alloy formed on the surface of the anode body as a result of diffusion between the cladding layer and the anode body.

2. An anode in accordance with claim 1 wherein said initial aluminum-magnesium alloy layer contains about 2% to about 3% magnesium, by weight, with the balance essentially aluminum, and said cladding layer being about 1% to 7% of the thickness of the composite consisting of the cladding material and the underlying lithium layer.

3. The method for improving the pulse performance of a lithium-organic electrolyte cell having a separator facing the lithium anode which comprises employing as anode a lithium body having a cladding layer of an aluminum-magnesium alloy laminated to the anode surface facing the separator, whereby the surface of said anode becomes roughened during use.

4. The method in accordance with claim 3 wherein said cladding layer initially contains about 2% to about 3%, by weight, magnesium and the balance essentially aluminum.

5. The method in accordance with claim 3 wherein the thickness of said cladding layer is about 1% to about 7% of the thickness of the composite consisting of said cladding layer and said lithium.

6. The method in accordance with claims 3, 4 or 5 wherein said cladding layer is perforated.

7. The anode of claims 1 or 2 wherein said cladding layer is perforated.

8. The cell according to claims 1 or 2 wherein the surface of the anode becomes roughened during use.

* * * * *

UNITED STATES PATENT AND TRADEMARK OFFICE
CERTIFICATE OF CORRECTION

PATENT NO. : 4,434,213

DATED : February 28, 1984

INVENTOR(S) : Niles Aaron Fleischer and Dennis Paul Johnson

It is certified that error appears in the above-identified patent and that said Letters Patent is hereby corrected as shown below:

Cover page, Inventors:, delete "Aaron F. Niles" and insert therefor --Niles A. Fleischer--.

Signed and Sealed this

Twenty-second Day of July 1986

[SEAL]

Attest:

DONALD J. QUIGG

Attesting Officer

Commissioner of Patents and Trademarks